United States Patent Office.

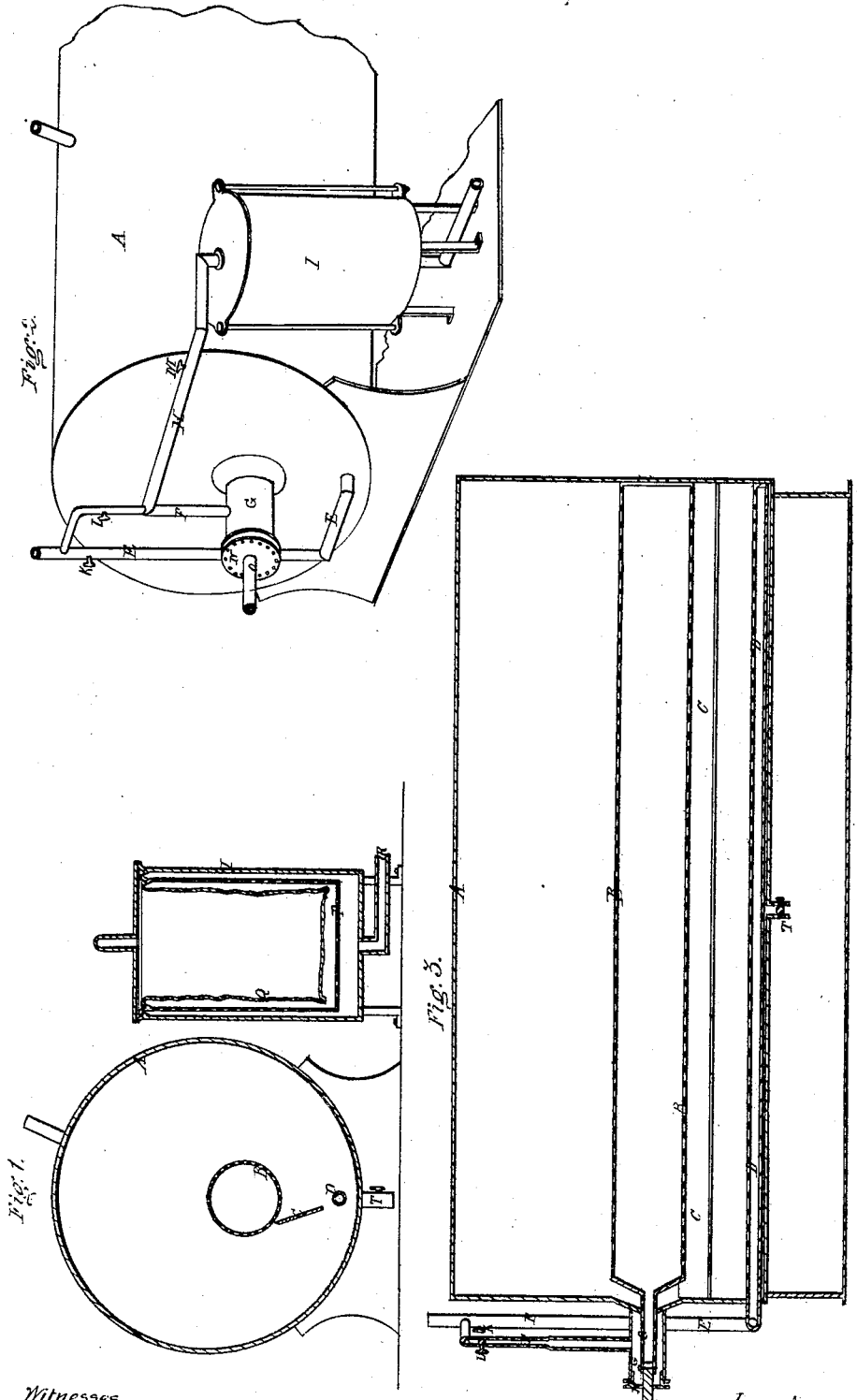

JAMES HUNTER, OF PHILADELPHIA, PENNSYLVANIA.

Letters Patent No. 101,735, dated April 12, 1870.

IMPROVEMENT IN APPARATUS FOR EXTRACTING MADDER.

The Schedule referred to in these Letters Patent and making part of the same.

*To all whom it may concern:*

Be it known that I, JAMES HUNTER, of the city of Philadelphia, in the State of Pennsylvania, have invented a new and improved Apparatus for Obtaining Pure Madder-Extract from Ground Madder-Root; and I do hereby declare the following to be a full, clear, and exact description thereof, which will enable others skilled in the art to which it appertains to make and use my invention, reference being had to the accompanying drawing which forms a part of this specification, and in which—

Figure 1 is a transverse section of my improved apparatus;

Figure 2, a perspective view; and

Figure 3, a longitudinal section thereof.

The same parts are denoted by the same letters in all the figures.

A is a digester, within which are a filter, B, a scraper, C, and a perforated pipe, D.

The pipe D communicates with a boiler through the pipe E, from which a branch, F, leads to the chamber G, and another branch, H, to the outside filter I.

K L M are stop-cocks.

N is a stuffing-box, through which projects the shaft O, to which the inside filter B is here represented as attached.

The outside filter I is provided with the usual wire filter P and cloth filter Q, and with a discharge-pipe, R.

The operation is as follows:

The madder having been introduced into the digester, and treated with hot water under a pressure produced by the steam, which is admitted from the boiler through the perforated pipe D, the woody fiber and sandy or earthy matters are separated more or less completely from the coloring matter which passes through the filter. The extract, still containing fine sand and woody fiber, passes out through the neck S, of the filter into the chamber G, and is forced, by the pressure of the steam, through the pipes F and H, into the outside filter I, where the coloring matter is separated from the sand and woody fiber, and is drawn off through the discharge-pipe. The fine garancine which is caught in the outside filter may be taken out and returned to the digester.

By means of the cock M the pressure on the outside filter may be diminished or shut off.

When the outside filter becomes stopped up, the cock M is closed, and the filter may readily be detached from the digester and a new one substituted.

Any number of outside filters may be connected with the digester and inside filter, and any suitable arrangement may be provided for diminishing the pressure of the steam in them or shutting it off entirely.

When the inside filter has become coated with an accumulation of woody fiber, garancine, &c., it may be cleaned by revolving it against the scraper by means of the shaft O. This shaft is represented as attached to the filter, but I do not limit myself to the construction shown, as the shaft may be connected with the scraper while the filter is stationary, in which case the latter will be cleaned by moving the scraper.

The inside filter may be made in any convenient form, and when it becomes stopped up it may also be effectually cleaned by closing the cocks K and M and blowing the steam through it by means of pipe F.

When the filter is a hollow cylinder I prefer to arrange the pipe in the manner shown, so that the garancine may be blown outward from the filter. Different arrangements, however, according to the construction of the filter, may be used to produce the same effect, by blowing steam through or upon it, as may be convenient, the steam and waste material escaping through the pipe T.

What I claim as my invention, and desire to secure by Letters Patent of the United States, is—

1. The combination of the digester and the outside filter.

2. The combination of the inside and outside filters.

3. The inside and outside filters, so connected that the outside filter may be subjected to the full pressure of the steam on the inside filter, or to a less pressure, as may be desired.

4. The combination of the digester with the detachable outside filter.

5. The steam-pipe, so arranged as to clean the filter by blowing through or upon it.

6. The combination of the scraper with the filter.

7. The combination of the scraper and filter within the digester, operated by a shaft worked from outside.

JAMES HUNTER.

Witnesses:
 WM. J. BURNS,
 WILLIAM R. WRIGHT.